(12) United States Patent
Jayanti et al.

(10) Patent No.: US 6,983,287 B1
(45) Date of Patent: Jan. 3, 2006

(54) DATABASE BUILD FOR WEB DELIVERY

(75) Inventors: Harish Jayanti, Redmond, WA (US); Christopher W. Anderson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 10/355,654

(22) Filed: Jan. 29, 2003

Related U.S. Application Data

(63) Continuation-in-part of application No. 10/187,859, filed on Jul. 1, 2002.

(51) Int. Cl.
*G06F 17/30* (2006.01)
(52) U.S. Cl. .................. 707/102; 707/101; 707/103 Y; 709/203; 715/509; 715/532
(58) Field of Classification Search .................... 707/4, 707/6, 10, 102, 101, 103 Y, 104.1; 705/39; 709/203, 246; 715/209, 513, 522, 530, 531, 715/532
See application file for complete search history.

(56) References Cited

U.S. PATENT DOCUMENTS

| | | | | |
|---|---|---|---|---|
| 5,724,576 A | * | 3/1998 | Letourneau | 715/810 |
| 5,787,432 A | * | 7/1998 | LeTourneau | 707/101 |
| 5,787,437 A | * | 7/1998 | Potterveld et al. | 707/104.1 |
| 5,838,965 A | * | 11/1998 | Kavanagh et al. | 707/103 R |
| 5,878,411 A | * | 3/1999 | Burroughs et al. | 707/4 |
| 6,014,647 A | * | 1/2000 | Nizzari et al. | 705/39 |
| 6,418,448 B1 | * | 7/2002 | Sarkar | 707/104.1 |
| 6,557,002 B1 | * | 4/2003 | Fujieda et al. | 707/102 |
| 6,611,840 B1 | * | 8/2003 | Baer et al. | 707/102 |
| 6,633,869 B1 | * | 10/2003 | Duparcmeur et al. | 707/6 |
| 6,704,747 B1 | * | 3/2004 | Fong | 707/104.1 |
| 6,807,181 B1 | * | 10/2004 | Weschler | 709/203 |
| 6,820,135 B1 | * | 11/2004 | Dingman et al. | 709/246 |

OTHER PUBLICATIONS

Data Conversion Laboratory, Inc. n.d. "Converting your Data into Corporate Assets: Converting the World's Knowledge Getting an Encyclopedia On the Web." 4pp. Available http://www.dclab.com/encyclopedia.asp.
American National Standards Institure Electronic Standards Store. n.d. "Information Retrieval Application Service Devinition and Protocol Specification for Open Systems Interconnection." 2pp. Available http://webstore.ansi.org/ansidocstore/product.
asp?sku=ANSI%2FNISO+Z39%2E50%2D1995.
Z/MBOL Overview. n.d. "Metadata Indexing & Searching from Fretwell-Downing." 1pg.
Braspenning, Peter J., et al. Jul. 2001. Conceptual Agent-Based Architectures for Artifactual Information Systems: how to realize the Virutal Reference Room concept? 15pp.

(Continued)

*Primary Examiner*—Shahid Al Alam
(74) *Attorney, Agent, or Firm*—Ronald M. Anderson

(57) ABSTRACT

Prestructuring disparate content data types prior to receiving any access requests to provide fast retrieval, assembly, and delivery of content data. Source content data are obtained from a source data structure that is readily created and editable by an author who does not have programming skills. The source content data are transformed into a predefined output structure that enables efficient access to the content data over a network. Predefined classes and entities of metadata indicate subsets of the content data that are deliverable and indicate relationships between elements of the content data. The content data and controlling metadata are preformatted for display and stored in fields of the output structure. The content data are also cross referenced by a plurality of categories within various areas of interest to create a hierarchical structure of interrelationships that is stored in the output structure, enabling a user to browse through related content data.

20 Claims, 16 Drawing Sheets

OTHER PUBLICATIONS

Burcham, Sarah. 1995. ACM Crossroads Xrds2-1: Harvest.4pp. Available http://www.acm.org/crossroads/xrds2-1/harvest.html.

Eom, Sean B. 2001. "Data Warehousing." *International Encyclopedia of Business and Management*, 2nd Edition, Edited by Malcolm Warner. 10pp: International Thomson Business Publishing Co., London.

Meers, Dan and Tom Meers, Introduction by William H. Inmon. Oct. 2001. "RODIN by Coglin Mill: Data Warehousing Success for IBM e Servers: *A Product Line Review.*" 20pp. Available Billinmon.com.

* cited by examiner

- Charlotte, The Vermont Whale

The University of Vermont offers an electronic exhibit about a fossil whale discovered in Vermont.

- Introduction to the Cetacea: Whales and Dolphins

The University of California at Berkeley Museum of Paleontology offers information on the biology and fossil record of cetaceans.

more

Quotation — 440

"The blue whale makes the loudest sound (over 150 decibels) of any animal."

Further Reading — 445

View a list of recommended books and journals related to Whale.

News Headlines — 450

Search news sites for articles about Whale.

Periodicals — 455

Search for periodical articles about Whale in Electric Library.

Search Electric Library's database of millions of articles from trusted news sources. Free registration required.

Internet Search — 460

Search the Internet for Web sites about Whale.

Encarta | Enquire
Please rate Encarta's answers to your question.
Not Relevant → Very Relevant
1 2 3 4 5
Main reason for your rating:
-select a reason- | Submit Home | Reference | Homework | College | Grad | Training | Parents | Experts | Shop | Help

DATABASE BUILD FOR WEB DELIVERY

RELATED APPLICATIONS

This application is a continuation-in-part (CIP) of prior copending U.S. patent application Ser. No. 10/187,859, filed on Jul. 1, 2002, the benefit of the filing date of which is hereby claimed under 35 U.S.C. § 120.

FIELD OF THE INVENTION

The present invention generally relates to a method and system for building a database of structured content, and more specifically, pertains to prestructuring large volumes of content for fast retrieval, assembly, and delivery of disparate content data types over a network.

BACKGROUND OF THE INVENTION

Digital storage technology has made it possible to compile and store vast amounts of information in a relatively small space. Compact discs (CDs) or digital video discs (DVDs) readily can store encyclopedias, dictionaries, scientific knowledge bases, product catalogs, service manuals, government documents, or other large volumes of content. The digital content of such storage media may also include sound, video, and other types of data that are not possible to provide using printed media. The digital form of content further enables easy keyword searching for specific information and easy browsing of associated content through hyperlinks. Communication technology has also made it possible to distribute this content over a local area network (LAN) or a wide area network (WAN), such as the Internet.

However, the sheer volume of content and limitations on communication bandwidth currently result in slower response times than desired for content searching, assembly of associated content, and content delivery of large data stores over a WAN or the Internet. Various prior art systems have been developed to speed up content data searching, such as searching only a select portion of the data. This method speeds data searching by designating only a subset of the entire body of data as searchable, such as only the abstracts of text articles. Another known method is to represent a body of text data by selected searchable key words, and process a search query only against the key words. A key word match results in returning a reference to the entire body of text data. However, neither of these methods is completely satisfactory, because it is impossible to fully predict the search terms that a user will enter to perform the query. A preferable approach predefines a set of searchable indices that are taken from the full text of the content and which point to the various pieces of content data. This approach is described in commonly assigned U.S. patent application Ser. No. 10/187,859, the drawings and detailed disclosure of which are hereby specifically incorporated herein by reference.

Evaluating a user query and delivering responsive content over a network also currently contributes to a slower response time than desired. Mapping the user's query to a predefined set of searchable indices through a set of Web services speeds this portion of the process. This mapping technique is described in commonly assigned U.S. patent application Ser. No. 09/867,228, the drawings and detailed disclosure of which are also hereby specifically incorporated herein by reference.

To make full use of mapping the user query to predefined indices, an improved technique is needed to associate the text, multimedia, and other various portions of content, so that the desired content can be retrieved from storage as quickly as possible. Search systems typically communicate with a database of content that is frequently updated. These databases are typically optimized for fast and easy revision of dynamically changing content, such as market data, scientific data, or other dynamically varying data. To ensure delivery of the most current data, the search system retrieves content from the database at the time a user query is made. In addition, the search system may evaluate the query and determine other relevant content, such as advertisements, to associate with the retrieved content. The search system then formats all the content and delivers it to the user. This dynamic process provides current information, but often, with a slower response time than desired. Response time further degrades as the amount of content delivered increases.

However, some content does not frequently change. For example, changes to product service manuals may simply correct errors or add improved techniques, but the product service manuals typically do not require hourly, daily, or even weekly updates. As another example, encyclopedia content may expand over time, but previously entered content typically does not often change. For large quantities of content that change predictably, it is desirable to perform easy revisions, but also improve retrieval, assembly, and delivery of disparate content data types in response to search requests. The prior art does not provide a solution that addresses these issues.

SUMMARY OF THE INVENTION

The present invention provides a method and system for prestructuring disparate content data types prior to receiving any search requests in order to provide fast retrieval, assembly, and delivery in response to a search request. Source content data are obtained from a source data structure that is readily created and editable by an author who does not have programming skills. The source content data are transformed into an output structure that enables efficient access of the content data, so that the content data can be quickly retrieved, delivered, and accessed over a network by a user in response to a search request. Prior to receiving a search request, the output structure is predefined with a plurality of fields for storing portions of the content data that will be accessible by the user.

Also predefined are metadata for the content data, whereby the metadata indicate one or more subsets of the content data that are deliverable via the network. For example, the metadata may indicate that some classes of data, such as three-dimensional (3D) video data, are not accessible over the network, or that some particular data are only accessible with a paid subscription. The metadata further indicate relationships between elements of the content data, such as related categories of content data and broader areas of interest. As suggested, within the metadata are defined a plurality of entities and a plurality of classes of the content data. Each class of content data corresponds to a different type of content data, such as text, images, video clips, audio clips, and other well known types of content data. The metadata also indicate which classes are to be included in the output structure, and indicate other control characteristics of each class of content. Similarly, the entities define format and delivery control characteristics of individual content data items to be included in the output structure.

As a function of the metadata, fields of the output structure are determined into which portions of the content data are to be stored. For example, a body of text for a content data item is stored in a text field. An outline of the content data item is stored in an outline field. Overall delivery control metadata for an individual content data item are stored in a main field. A number of other fields are used to store corresponding portions of the content data, so that selected portions of the content data can be retrieved, assembled, and delivered.

Once the output structure is defined with fields, portions of the content data are obtained from the source structure in accord with the plurality of classes and entities of the metadata. The content data are then preformatted and stored in the fields of the output structure as determined by the metadata. Preformatting includes paginating and structuring the plurality of content data items for display. Preformatting may also include identifying locations within the content data to display supplemental content, such as advertisements. Preferably, the content data are preformatted and stored in accord with extensible markup language (XML) standards.

To further improve access, the content data are cross referenced by a plurality of categories within various areas of interest to create a hierarchical structure of interrelationships. The hierarchical structure is stored in the output structure, so that a user is able to browse through related content data. The classes and entities of the metadata relate the content data to the categories and areas of interest.

Another aspect of the invention is a memory medium having machine instructions stored thereon for causing a processor to perform the steps introduced above and described in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIGS. 15A and 15B, which together comprise FIG. 15, are screen shots illustrating an exemplary browser display resulting from a query on the word "whale."

DESCRIPTION OF THE PREFERRED EMBODIMENT

An exemplary preferred embodiment of the present invention is described below with regard to its use in ENCARTA™ multimedia encyclopedia reference program marketed by Microsoft Corporation. However, it must be strongly emphasized that the present invention has application to many other types of databases and is generally applicable to any type of content data. As with many databases, the ENCARTA reference program can be run as a stand-alone application on an individual computer or can be accessed over a network, such as the Internet. An exemplary operating environment for the present invention is described below.

Exemplary Operating Environment

Figure 1:
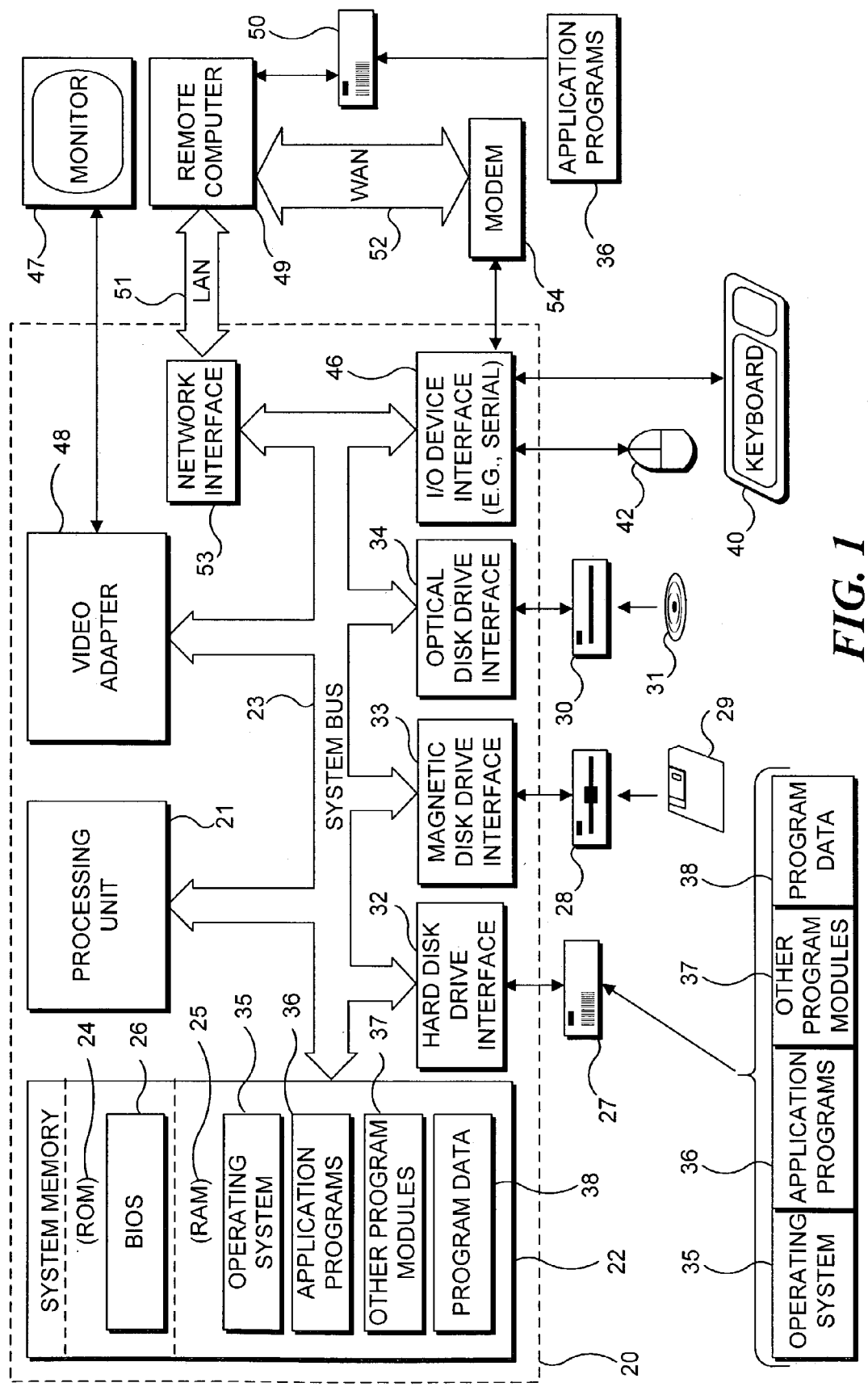
FIG. 1 is a schematic block diagram of an exemplary personal computer (PC) system suitable for implementing the present invention, in regard to both a server and a client computer.

FIG. 1 and the following discussion are intended to provide a brief, general description of a suitable computing environment for use in implementing the present invention. Although not required, a portion of the present invention will be described in the general context of computer executable instructions, such as program modules that are executed by a PC. Generally, program modules include routines, programs, objects, components, data structures, etc. that perform particular tasks or implement particular abstract data types. Those skilled in the art will appreciate that this invention may be practiced to build, request, retrieve, assemble, and delivery content within other computing system configurations that include mainframe computers, minicomputers, multiprocessor systems, network PCs, pocket personal computing devices, game consoles, TV set-top boxes, hand held devices, peripheral devices, digital cell phones, industrial control equipment, automotive equipment, aerospace equipment, and other microprocessor-based or consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary system for implementing steps of the present invention comprises a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within the PC 20, such as during start up, is stored in ROM 24.

The PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35, one or more application programs 36, other program modules 37, and program data 38.

A user may enter commands and information into PC 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term I/O device interface is intended to encompass each interface specifically used for a serial port, a parallel port, a game port, a keyboard port, a PS/2 port, a USB port and/or other communication port. Similarly, a monitor 47 or other type of display device is also connected to system bus 23 via an appropriate interface, such as a video adapter 48, and is usable to display graphical user interfaces, Web pages, and/or other information. In addition to the monitor, PCs are often coupled to other peripheral output devices (not shown), such as speakers (through a sound card or other audio interface—not shown).

PC 20 may operate in a networked environment using logical connections to one or more remote sources, such as a remote computer 49. Remote computer 49 may be another PC, a server (which is typically generally configured much like PC 20), a router, a network PC, a peer device, a satellite, or other common network node, and typically includes many or all of the elements described above in connection with PC 20, although only an external memory storage device 50 has been illustrated in FIG. 1. In a networked environment, program modules depicted relative to PC 20, or portions thereof, may be stored in the remote external memory storage device. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet. Modem 54, which may be internal or external, is typically coupled directly to the system bus via an internal slot, coupled to the bus via I/O device interface 46, or coupled to the bus via network interface 53. For example, modem 54 may be a broadband modem, such as an ADSL modem, that is coupled to the system bus via a USB interface. It will be appreciated that the network connections shown are exemplary and other means of establishing a communications link between the computers may be used, such as wireless communication and wide band network links.

Exemplary Implementation of the Present Invention

Figure 2:
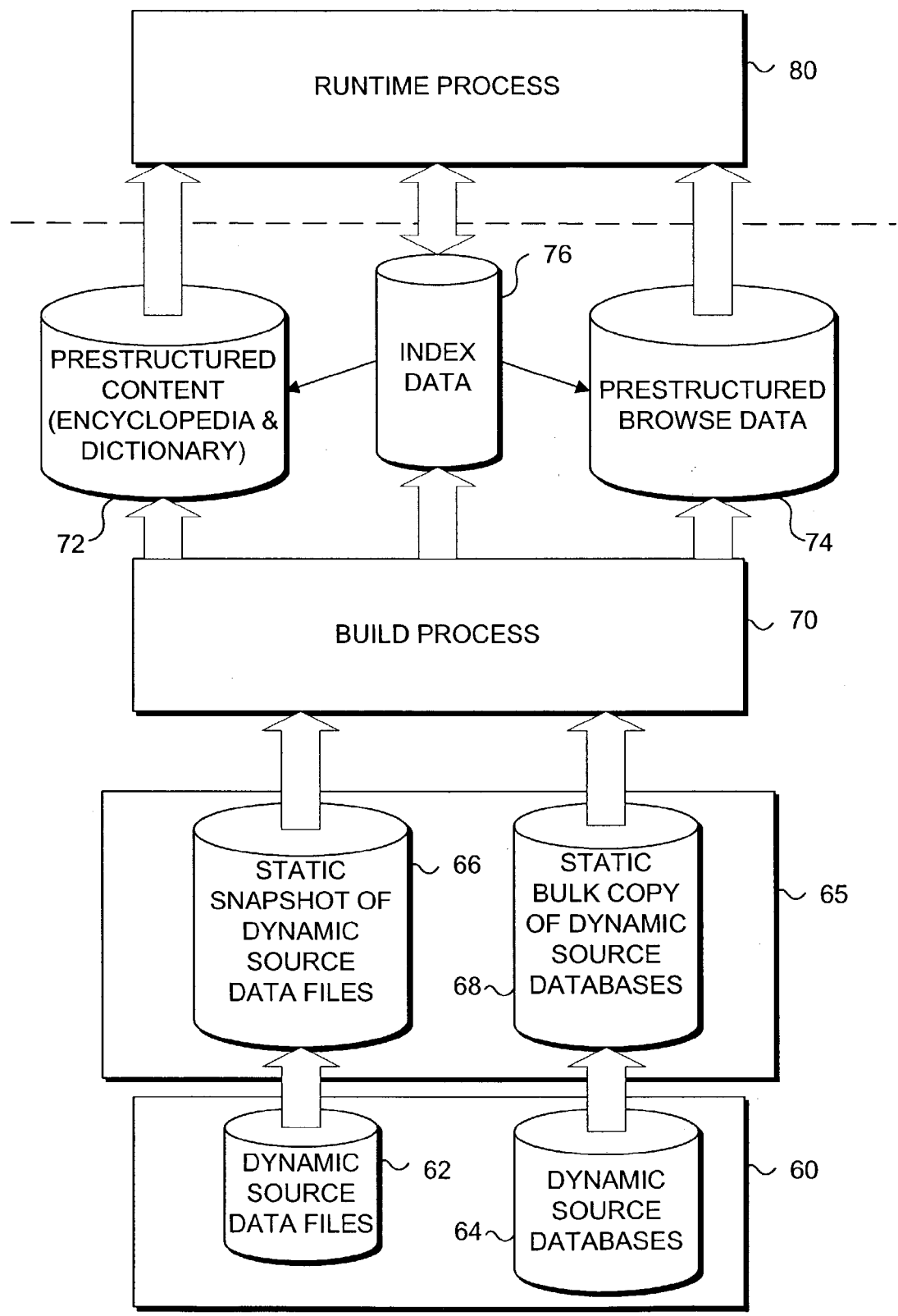
FIG. 2 is a block diagram of an overall architecture of data and processes used to build the prestructured set of content data.

The following describes an exemplary implementation of a preferred embodiment for building a prestructured set of content data for an online encyclopedia to enable fast retrieval, assembly, and delivery of the data in response to a search request. FIG. 2 is a block diagram of an overall architecture of data and processes that are used to build the prestructured set of content data. A dynamic development environment 60 enables easy manual creation and modification of source content for online and offline versions of an encyclopedia. The creation and modifications would typically be performed by authors, an editorial staff, or other nonprogrammers. Preferably, the source content is stored in dynamic source data files 62 and dynamic source databases 64. Dynamic source data files 62 may comprise XML documents, text documents, image files, audio files, multimedia files, and/or other conventional data files. Dynamic source databases 64 may comprise structured query language (SQL) data, data tables, and/or other conventional data structures. Dynamic source data files 62 and dynamic source databases 64 are structured and formatted to optimize entry and revision of source data.

A static storage environment 65 obtains and stores a static snapshot of the dynamic source data. Preferably, a copy of dynamic source data files 62 is made at a point in time and stored as a static snapshot 66 of the dynamic source data files. Similarly, a copy of dynamic source databases 64 is made at approximately the same point in time and stored as a static bulk copy 68 of the dynamic source databases. Static content of static storage environment 65 provides input to a build process 70 that transforms the static content into an output data structure that is optimized for fast retrieval and delivery of the content to a browser. The output structure preferably comprises prestructured content 72, prestructured browse data 74, and index data 76. Prestructured content 72 preferably comprises content tables for encyclopedia content and dictionary content that is preformatted for use by a browser. Similarly, prestructured browse data 74 preferably comprises a preformatted hierarchical structure that enables browsing through desired content with the browser. Index data 76 comprises indices for mapping a search query to prestructured content 72 and prestructured browse data 74. Details regarding index data 76 are provided in commonly assigned U.S. patent application Ser. No. 10/187,859 and commonly assigned U.S. patent application Ser. No. 09/867, 228, the drawings and disclosure from both of which were specifically incorporated by reference above. Prestructured content 72, prestructured browse data 74, and index data 76 are produced offline before any search request is submitted through an online runtime process 80.

Figure 3:
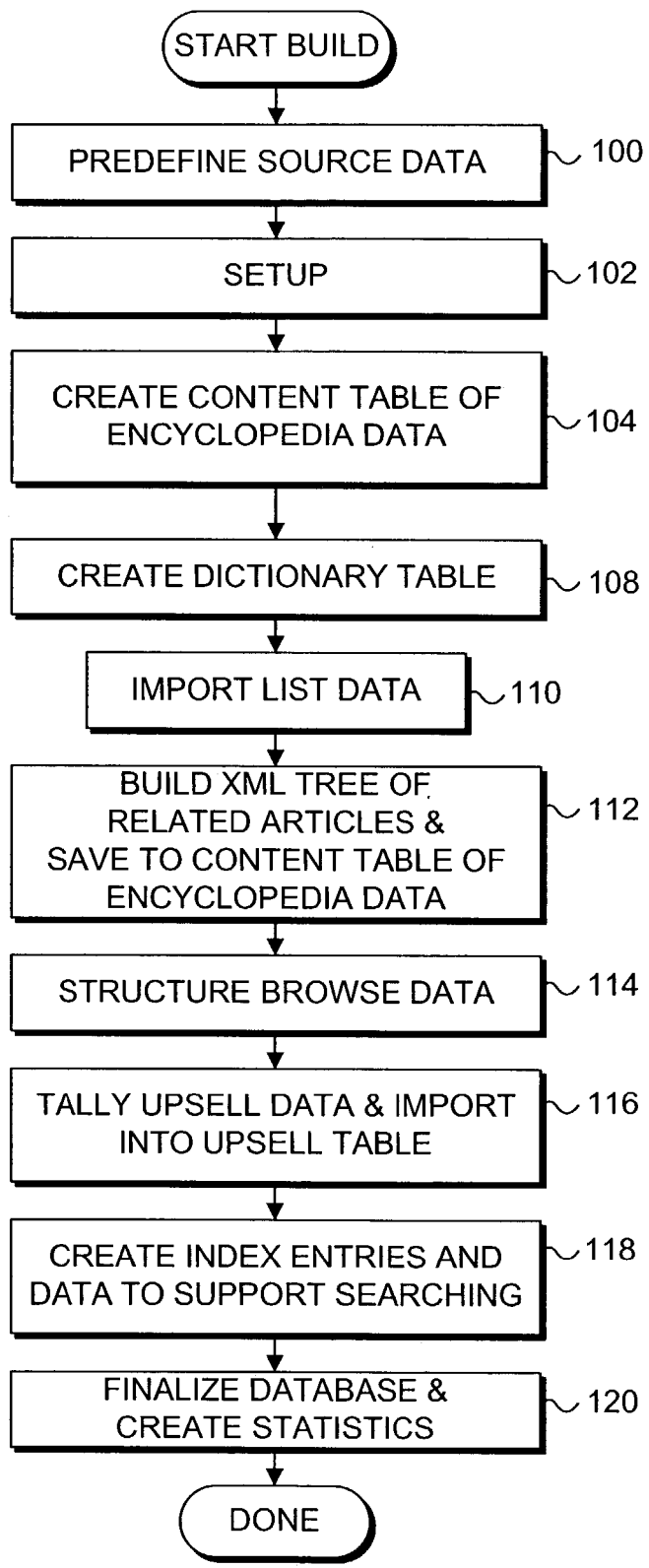
FIG. 3 is a flow diagram illustrating overall logic for preparing and building the prestructured content and prestructured browse data.

While the original content may be entered and modified by nonprogrammers, such as an editorial staff, these same nonprogrammers will often prefer to control the content that is delivered to the output data structure and specify other characteristics of the delivered content. Build process 70 provides this flexibility, as described in further detail below. FIG. 3 is a flow diagram illustrating the overall logic for preparing and building the prestructured content and prestructured browse data. At a step 100, dynamic source data are created and a snapshot copy is taken to predefine the static source data, as described above. At a step 102, a build system executes setup steps to initialize the build process and create a skeleton data base for the prestructured content and the prestructured browse data. The build system then creates a content table of encyclopedia data at a step 104.

At a step 108, the build system creates a dictionary table of word definitions and related content and then, at a step 110, imports list data such as lists of presidents, states, countries, etc. The list data are preferably created along with other predefined source data of step 100 above. The list data are also preferably prestructured into hierarchical groupings, such that further transformation is unnecessary. Thus, the list data may be imported from the static content into the prestructured content or the prestructured browse data without further processing. At a step 112, the build system creates an XML tree articles related to encyclopedia content items and saves the tree to the content table of encyclopedia data. Preferably, related articles are stored in the static bulk copy of source databases, so that the related article data can be processed independently of the above step to create the content table of encyclopedia data. Similarly, at a step 114, the build system structures browse data for fast and easy browsing of related content with the browser.

Not all content is necessarily provided online. Instead, some content may be provided to users only on CDs or DVDs. To inform online users of additional content available on a memory media, a tally of this additional data available on the memory media is imported into an upsell table of the prestructured content, at a step 116, for later display to an online user. At a step 118, the build system creates index entries and other index data, such as search match words, to support mapping a search query to the prestructured content during the runtime process. As noted above, details describing indexing in support of searching are provided in the commonly assigned U.S. patent applications that have been incorporated herein by reference. Finally, at a step 120, the build system optimizes the database of prestructured content, prestructured browse data, and index data for efficient storage and access by the runtime process. The build system also creates statistics regarding execution of the build process and the resulting database.

Figure 4:
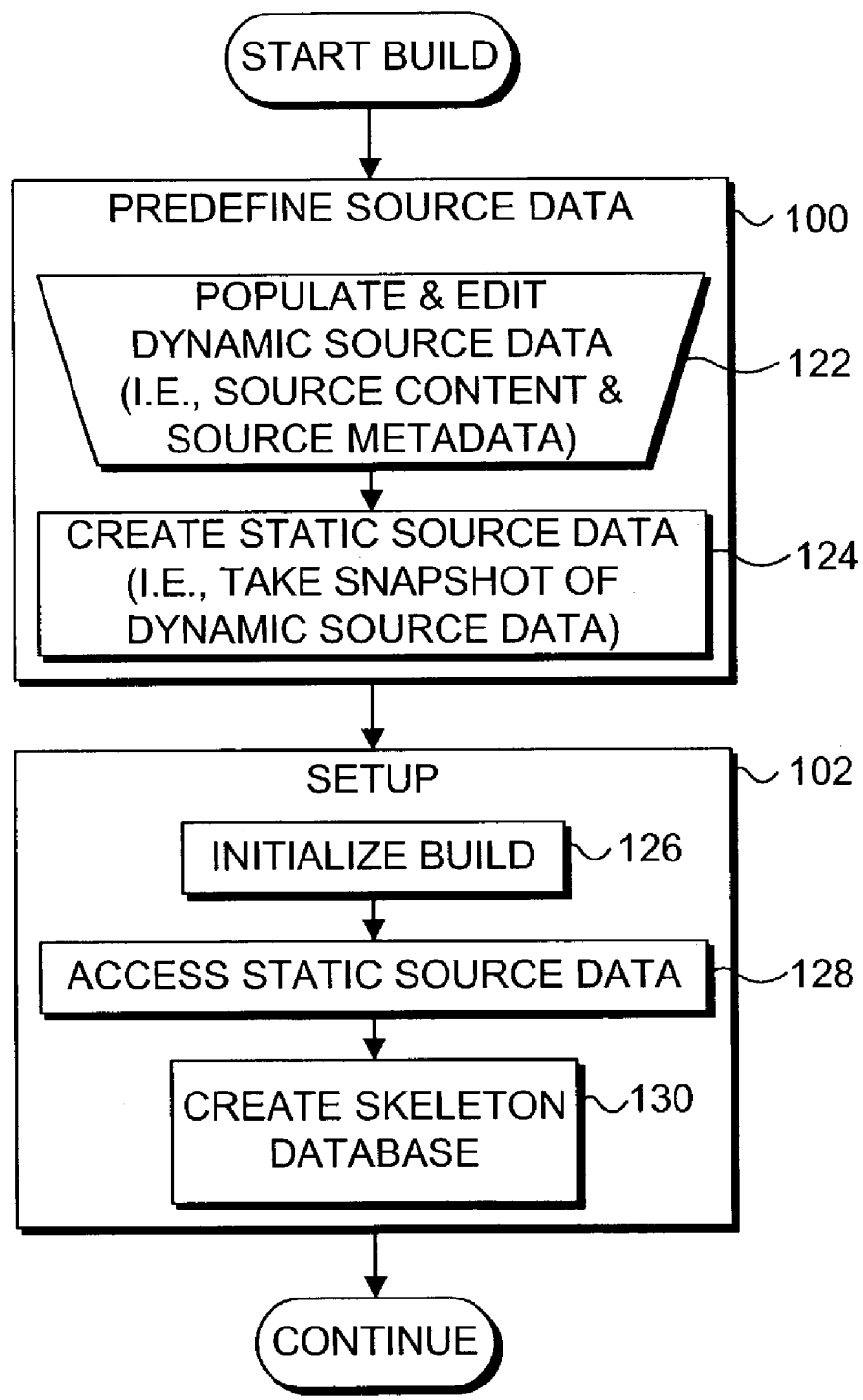
FIG. 4 is a flow diagram illustrating details of steps used to predefine source data and set up a prestructured database.

Further details regarding some of the steps in the above overall process will now be discussed. FIG. 4 is a flow diagram illustrating some details of the steps shown in FIG. 3 to predefine source data and set up the prestructured database. Specifically, step 100, which predefines source data, includes a step 122 for populating and editing the dynamic source data. Recall that dynamic source data are preferably entered manually in an environment that is optimized for data entry and revision. For example, a conventional word processor or text editor may be used to enter text data; a graphics program may be used to enhance or customize an image. A database may be used to define metadata regarding desired formatting and relationships between portions of the source content. With regard to metadata, the dynamic source databases may define classes of source content, categories of source content, groups of source content, entities of source content, and relationships between the various forms of metadata and between the metadata and the source content. Preferably, the source content, which includes text, media data, and metadata, conform to conventional format standards such as XML, Joint Photographic Experts Group (JPEG), Moving Picture Experts Group (MPEG), SQL, and other well known media format standards. As discussed above, a snapshot copy of the dynamic source data is taken at a step 124 to create the static source data. Taking a snapshot copy is sometimes referred to as a level-one process.

Once the static source data are prepared, the build system performs step 102, which includes a series of setup steps. First, the build system initializes the build process at a step 126. Initialization preferably includes creating output directories where resulting prestructured data and log files will be stored. The initialization step may also include building a configuration file, obtaining the most current source code, creating necessary binary code, and registering dynamic link libraries (DLLs).

As part of the setup step, the build system also accesses the static source data, at a step 128. The build system may need to establish links to a variety of sources storing the static source data. Additional sources may include data that are prebuilt for the CD or DVD version of dictionary data, to eliminate the need to rebuild an online version.

At a step 130, the build system creates a skeleton database to hold the resulting prestructured output data. This setup step may include creating a separate table or database for each content language and optimizing the size of the tables and databases. The build system may further insure that the tables are completely empty and that proper defaults are specified. The build system may also add a number of stored processes to the skeleton database for internal use during the build process. The skeleton database may then be populated with static bulk copy source data.

Figure 5:
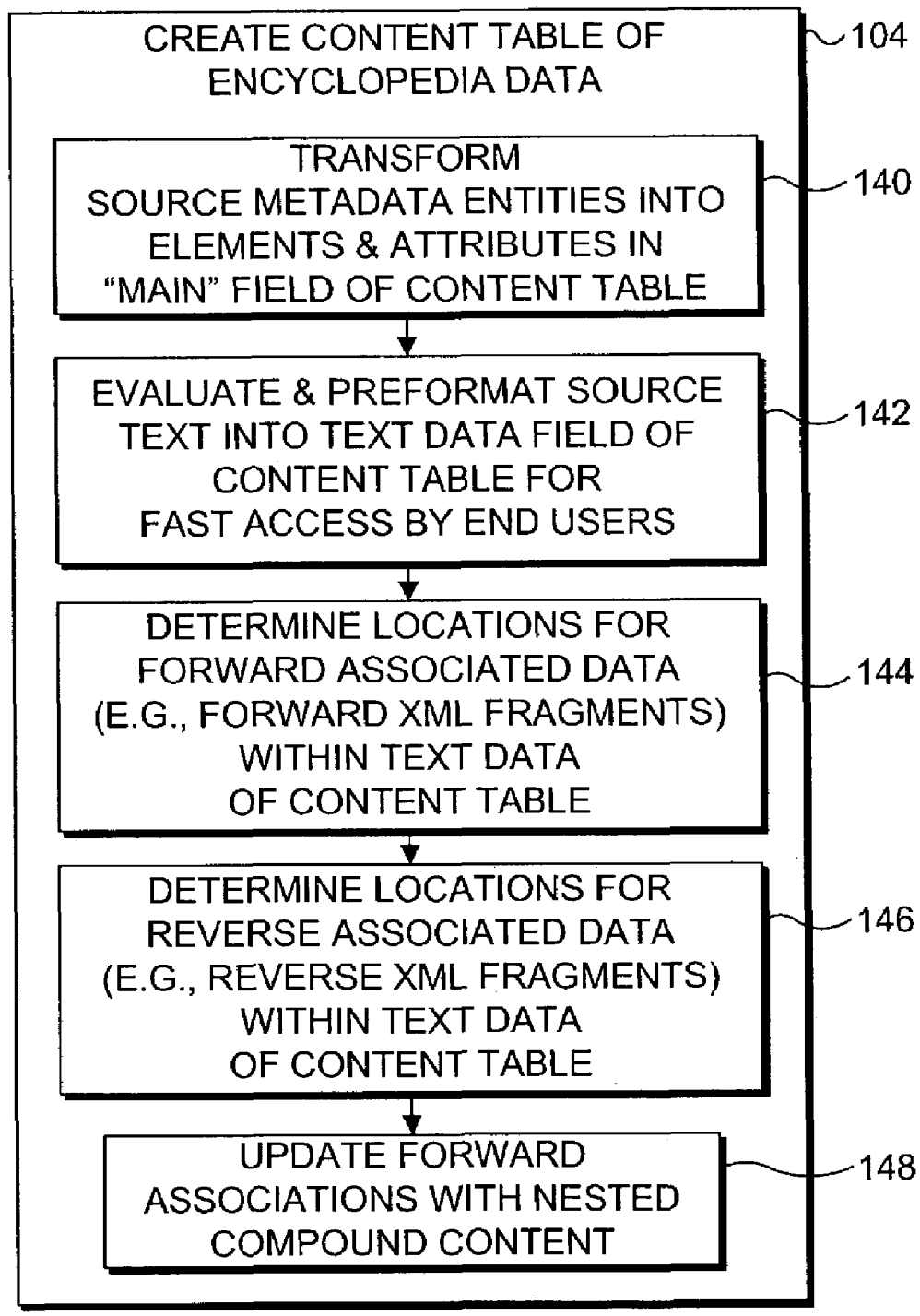
FIG. 5 is a flow diagram illustrating the logic for creating a content table of encyclopedia data.

Once the setup steps are complete, the build system creates a content table of encyclopedia data. FIG. 5 is a flow diagram illustrating logic for creating the content table of encyclopedia data. FIG. 5 provides further details of step 104 in FIG. 3. At a step 140 of FIG. 5, the build system transforms source metadata entities into XML elements and attributes that control delivery and presentation of encyclopedia content. Preferably, many of these elements and attributes are stored in a "main" field of the content table. Related XML fragments are also stored in a category table. Step 140 is discussed in further detail below with regard to FIGS. 6–9. At a step 142 of FIG. 5, the build system evaluates and preformats source text into a text data field of the content table for fast access by online end users. Details regarding step 142 are discussed below with regard to FIG. 10.

At a step 144 of FIG. 5, the build system determines locations for forward associated data within text data of the content table. For example, image, sound, video, or other media may be manually associated with sections of an encyclopedia text article. However, when the encyclopedia text article is preformatted for display in a browser, the associated media may need to be placed or relocated within the preformatted pages of the encyclopedia article. Analogously, the build system includes reverse associated data, at a step 146. Reverse associated data is similar to forward associated data, but is grouped by target. For example, reverse associated data may be used for an "Appears In" feature, which may list all of the articles that a picture is associated with. Nesting of associated data is also prepared and stored in the prestructured content to avoid the need for multiple accesses to the prestructured content as a user navigates through associated data. Predefining references to nested data from each content item does result in duplication of data, but nevertheless speeds delivery of desired content to a user. Thus, the build system recursively inserts references to child data for each parent content item, by updating the forward associations, at a step 148. Those skilled in the art will recognize that other encyclopedia data may be preprocessed, such as determining information that can be used by a media display page.

Figure 6:
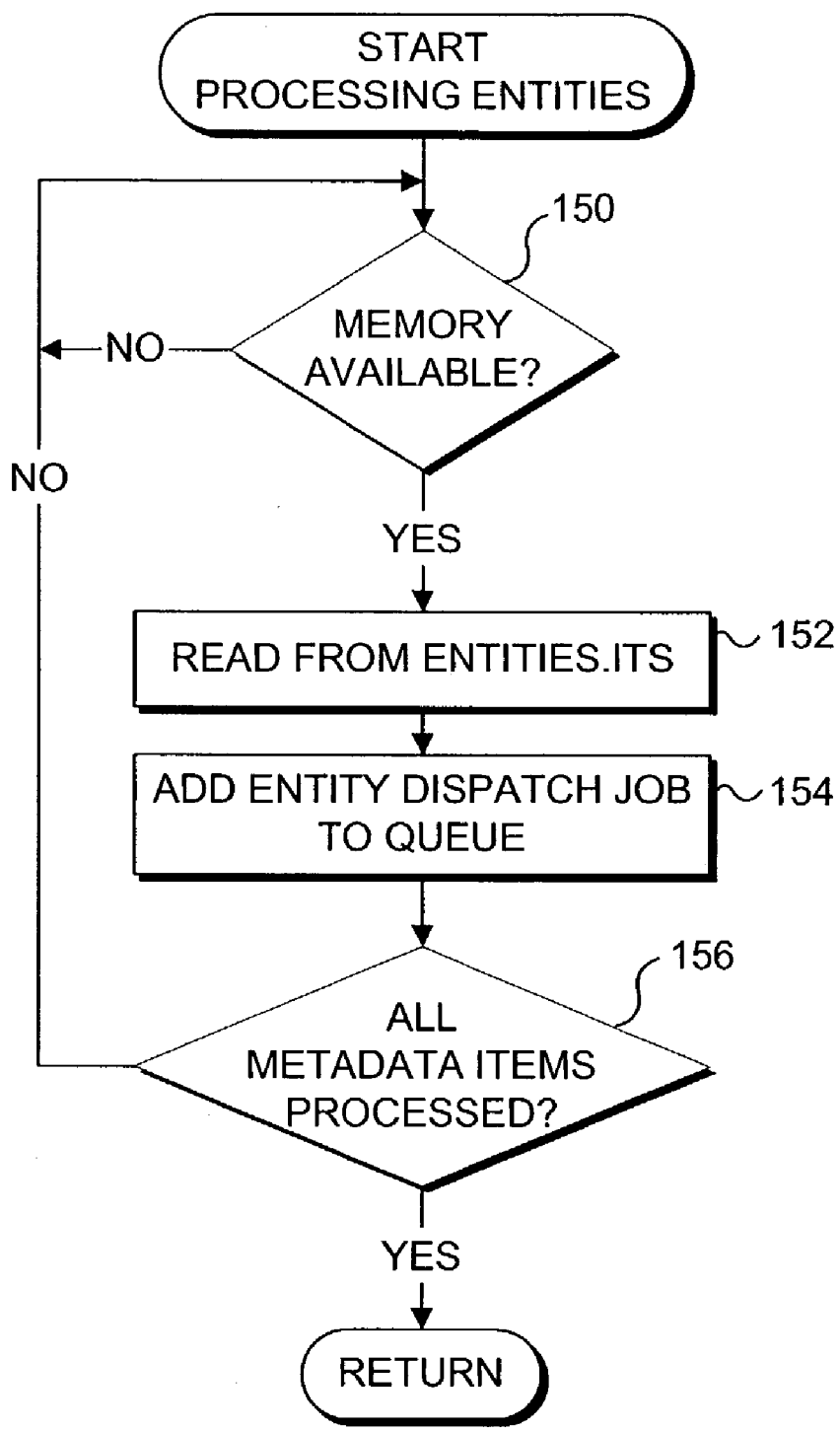
FIG. 6 is a flow diagram illustrating the logic for initiating processing of metadata entities associated with content items.

FIGS. 6–10 provide further details regarding creation of the content table of encyclopedia data broadly indicated in FIG. 5. For instance, as stated above, the build system first processes metadata for the content table, as indicated by step 140 of FIG. 5. To begin transforming source metadata entities into content table elements and attributes, the build system begins processing a predefined set of entities associated with each content item. FIG. 6 is a flow diagram illustrating the logic for initiating the processing of metadata entities associated with each content item. At a decision step 150, the build system determines whether sufficient memory is available to process a set of entities for a next content item. If insufficient memory is available, the build system simply loops back to decision step 150 until sufficient memory becomes available. When sufficient memory is available, the build system reads a set of predefined entities, at a step 152, that are associated with a next content item. Entities are preferably stored in a conventional static source data file with a conventional structured file format, such as that shown in a sample entities.its file of Appendix A. As seen in Appendix A, a content item is identified by a unique value of a reference identifier attribute (REFID). A content item has an associated set of entities, each of which is specified by a unique value in an entity identifier attribute (ID). Each content item is also associated with a particular class of content by a class name attribute (CLASSNAME). As indicated above, classes of content include text articles, photographs, audio clips, video clips, etc.

Once a set of entities for a current content item has been read, the build system adds a job to an execution queue, at a step 154. For convenience, this job will be referred to as an entity dispatch job. Further detail regarding the entity dispatch job is discussed below, in respect to FIGS. 7 and 8. Upon queuing an entity dispatch job, the build system determines, at a decision step 156, whether all content items have been processed. If any content items remain to be processed from the entities.its file, control returns to decision step 150 to process another content item. Once all content items have been processed, control returns to a control module.

Figure 7:
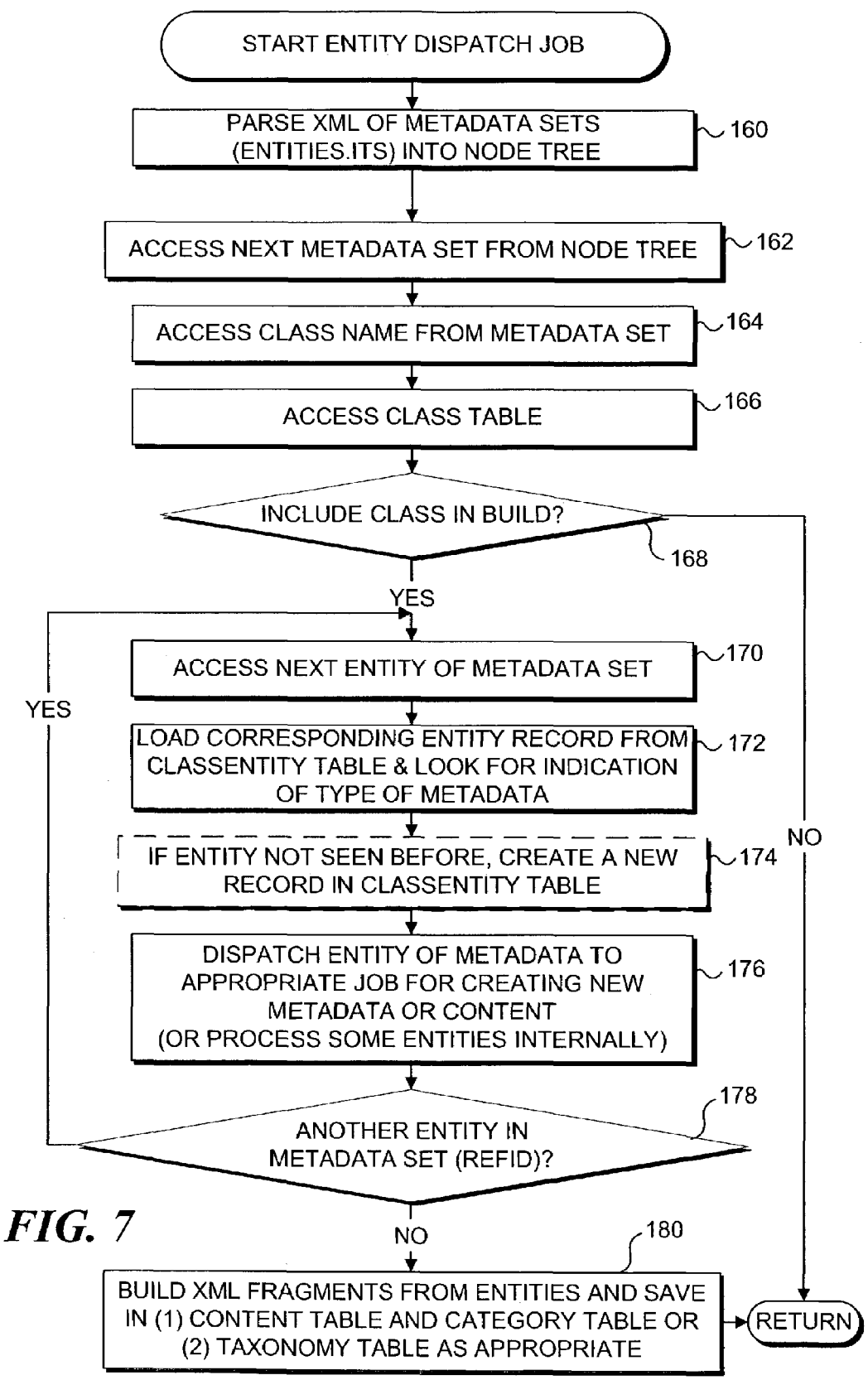
FIG. 7 is a flow diagram illustrating further detailed logical steps for processing metadata entities associated with content items.

FIG. 7 is a flow diagram illustrating further detailed logic for processing metadata entities associated with content items. At a step 160, the build system parses XML code of the entities.its file into a hierarchical node tree structure of entity sets for easy access to the metadata entities. Each entity set includes a number of metadata entities associated with a corresponding content item that is identified by the unique value of the REFID attribute.

At a step 162, the build system accesses a next set from the node tree, which corresponds to accessing a next ENTITIES tag with a unique REFID. The build system then accesses a CLASSNAME attribute from the currently accessed set (i.e., from the current ENTITIES tag), at a step 164. Knowing the CLASSNAME value, the build system accesses a class table, at a step 166. The class table defines characteristics of a class, such as characteristics of articles, photographs, audio/video media, other images, charts, tables of data, brief facts related to content items, Web links, quotations, authors, biographies, etc. A sample class table is illustrated in Appendix B. At a decision step 168, the build system determines from the class table whether to include the class identified by the CLASSNAME into the build process. For example, a CLASSNAME value of "art," as shown in Appendix A, identifies an article class. The sample class table of Appendix B includes a column of attributes for the article class, including an INCLUDEINBUILD attribute defining whether a class should be included in the build process. Some classes of content may be included in a CD version of the encyclopedia, but may not be included in the online version of the encyclopedia. For example, 3D virtual tour data that enables a user to "walk around" in a virtual environment may be too large to include in the online version of the encyclopedia, but not too large to include in the CD/DVD version of the encyclopedia.

If the class is not to be included in the process of building the content database, control returns to a controlling module. However, if the class is to be included, the build system accesses an entity in the node tree, at a step 170. As indicated above, the entity is parsed from the entities.its file, and the accessed entity is within the current set of metadata entities. For example, the build system may access a CATEGORY entity from the node tree. At a step 172, the build system loads a corresponding entity record from a class entity table to obtain further detailed indication of the type of metadata that the entity represents. A sample class entity table is illustrated in Appendix C. For instance, the class entity table illustrated in Appendix C indicates that the CATEGORY entity is considered a main element by the fact that a one (1) is present in the MAIN ELEMENT column of the class entity table.

Dividing the metadata into a class table, class entity table, and other tables provides content creators with detailed control over what is built into the final content database(s) without requiring changes to the build system itself. However, this flexibility sometimes results in additional metadata that is not accounted for in all of the necessary tables and files that contain the metadata. For example, if metadata from one of the static files, such as the entitites.its file, is not associated with a record of the class entity table, an error would result when the build system attempted to load the corresponding entity record from the class entity table. To prevent this problem, the build system creates a new record in the class entity table with default values in each column, at an optional step 174. Those skilled in the art will recognize that the build system could alternatively report an error, or take other appropriate action.

Once the current entity of the current set has been evaluated via the tables, the build system performs the appropriate process for that current entity, at a step 176. Generally, the entity will be dispatched to another job for additional processing. Further detail regarding appropriate processing is discussed below with regard to FIG. 8. Having dispatched, or otherwise initiated appropriate processing for the entity, the build system determines, at a decision step 178 of FIG. 7, whether another entity of metadata is present for the current set in the node tree. If another entity exists, control returns to step 170 to process the next entity.

Once all of the entities for a particular set have been evaluated and appropriate data created in memory, the build system saves the data in the content table or other appropriate output table of the content database, at a step 180. For example, the build system saves XML fragments derived from the entities into the content table and category table. The build system also preferably saves XML fragments defining browse data in an appropriate taxonomy table. Further detail is described below with regard to FIG. 9. Control then returns to the appropriate controlling module, which preferably processes text content from loose text files and a primary static file of text content. Further detail regarding text processing is described below with regard to FIG. 10.

Figure 8:
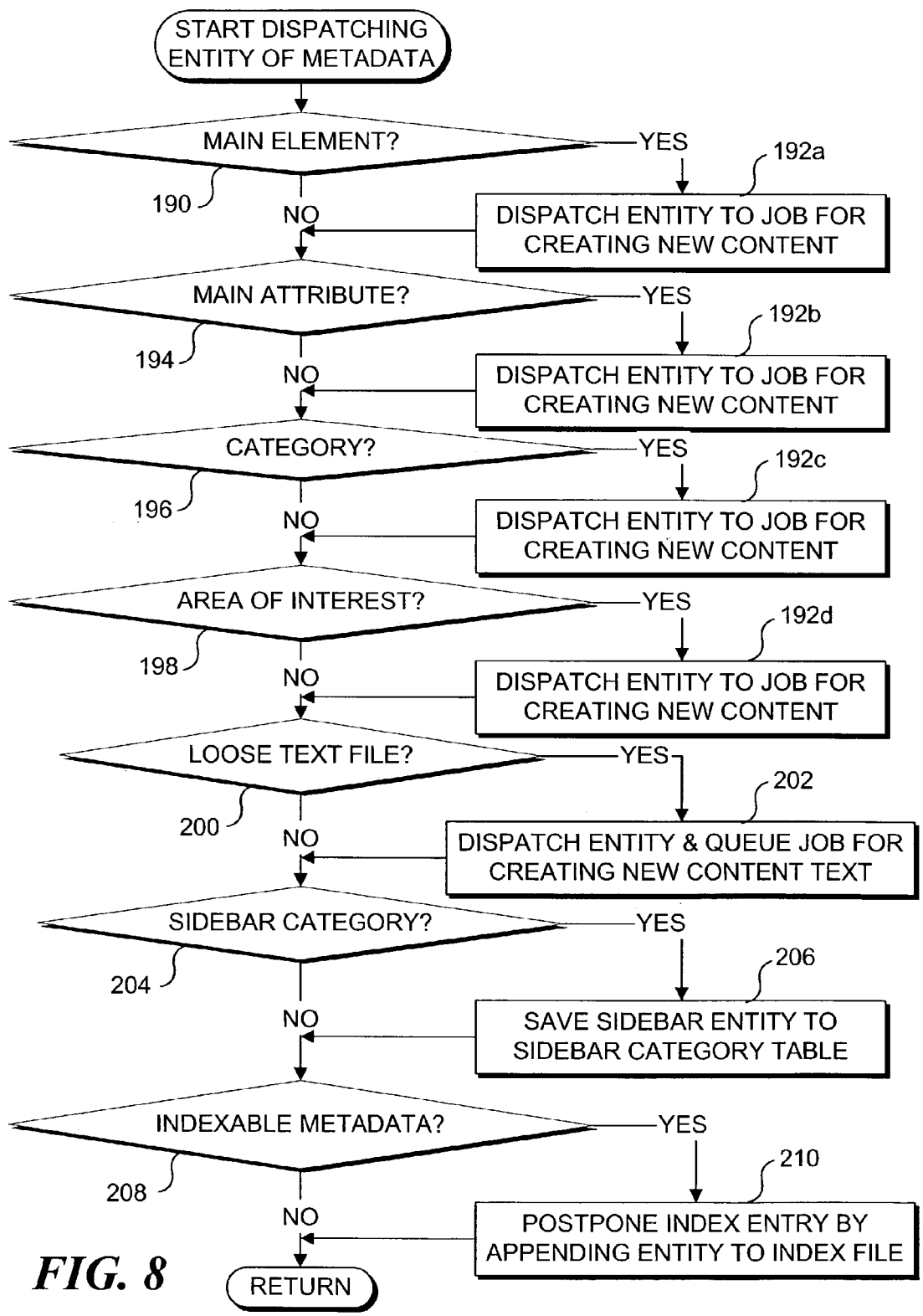
FIG. 8 is a flow diagram illustrating detailed logical steps for dispatching or otherwise processing an entity of metadata.

FIG. 8 is a flow diagram illustrating further detailed logic for dispatching or otherwise processing an entity of metadata corresponding to step 176 of FIG. 7. At a decision step 190 of FIG. 8, the build system determines whether the entity is identified as a main element. A main element is typically a general descriptor of the corresponding content item, or other common type of metadata. For example, a main element may be an article title, a caption of a photograph, etc. If the entity is a main element, the build system dispatches the entity, at a step 192*a*, to a job for creating new metadata content. Typically, this job will add the entity and any associated attributes and values to the content table as an XML element. As suggested above, further detail regarding the job for creating new metadata content is described below with regard to FIG. 9.

Having dispatched a job to process the entity as a main element, or if the entity is not a main element, the build system then determines if the entity identifies other metadata. Each entity may correspond to multiple types of metadata. Thus, control passes to a decision step 194 to determine whether the entity is alternatively, or additionally, a main attribute. A main attribute identifies metadata that is to be added to a root element of XML for the corresponding content item in the content table. For example, the REFID would be added to the root element of the corresponding content item. Also added to the root element may be certain flags, such as a flag that indicates whether the corresponding content item is accessible online for free, or accessible only to subscribing users. If the entity is a main attribute, the build system initiates another instance of the job to create new metadata content, at a step 192*b*. Although the same job is instantiated, the job will process the entity slightly differently as a main attribute instead of a main element.

Similarly, the build system determines, at a decision step 196, whether the entity is alternatively, or additionally, a category entity. If the entity is a category entity, the build system dispatches the entity to another instance of the job to create new metadata content, at a step 192*c*. In this case, the job will use the entity attributes and values to create a record in a category table that relates the corresponding content item to a taxonomy (i.e., a tree structure) of categories from which a user can select, to browse through the content. Preferably, the category table is associated with the content table by the REFID and a category identifier key.

Similarly, the entity typically will associate the corresponding content item to an area of interest that includes a number of categories. Thus, the area of interest represents a higher level in the hierarchy of browsable content. Correspondingly, the build system determines, at a decision step 198, whether the entity is alternatively, or additionally, an area of interest entity. If the entity is an area of interest entity, the build system dispatches the entity to another instance of the job that creates new metadata content, at a step 192*d*. In this case, the job will use the entity attributes and values to populate a record in a category table with XML metadata that relates the corresponding content item to the taxonomy, which also includes areas of interest from which the user can select, to browse through broader divisions of the content.

Most text for content items is preferably contained in a separate large text.its file that can be processed as a batch. However, sometimes a loose text file of content may be associated with a content item. To check for a loose text file, the build system determines, at a decision step 200, whether the entity identifies a loose text file. If the entity identifies a loose text file, the build system dispatches the entity to a different job, at a step 202, so that the entity is queued to later create preformatted text data in the content table from the loose text file. Preferably, the build system uses this text job to create the preformatted text in the content table from either a loose file or from the large file of text content (e.g., text.its). However, for computational efficiency, separate instances of the text job may be used for each loose file and for the large text.its file. Further detail regarding creation of preformatted text in the content table is discussed below with regard to FIG. 10.

Some entities are not dispatched to other jobs, because the processing needed is minimal. For example, references to some special content are not dispatched. Specifically, some text, media, or other content are related to the content item that is associated with the current metadata entity, but the other content was created by an "outside author." Such content items are referred to as sidebars. Sidebars are browsable by categories, in a manner similar to content created by "inside authors." Processing metadata regarding sidebar categories is a relatively trivial task. Accordingly, the build system determines, at a decision step 204, whether the current entity identifies a sidebar category. If the current entity corresponds to a sidebar category, the build system saves the entity in a sidebar category table, at a step 206.

Alternatively, some entities are related to jobs that are more efficient if executed after the content table is fully populated with metadata and corresponding content. For example, as discussed in the two patent applications that are incorporated herein by reference, some entities relate to indices that can be used to match user queries to specific content. However, it is inefficient to determine and enter search indices. It is more efficient to process search indices at a later time, as a batch process. Thus, at a decision step 208, the build system determines whether the entity is related to indexing. If the entity provides indexing metadata, the build system appends the entity to an index file (or source table) at a step 210, for later processing. This step effectively postpones entry of the indexing metadata. Those skilled in the art will recognize that other metadata entities may be processed in a similar manner.

Figure 9:
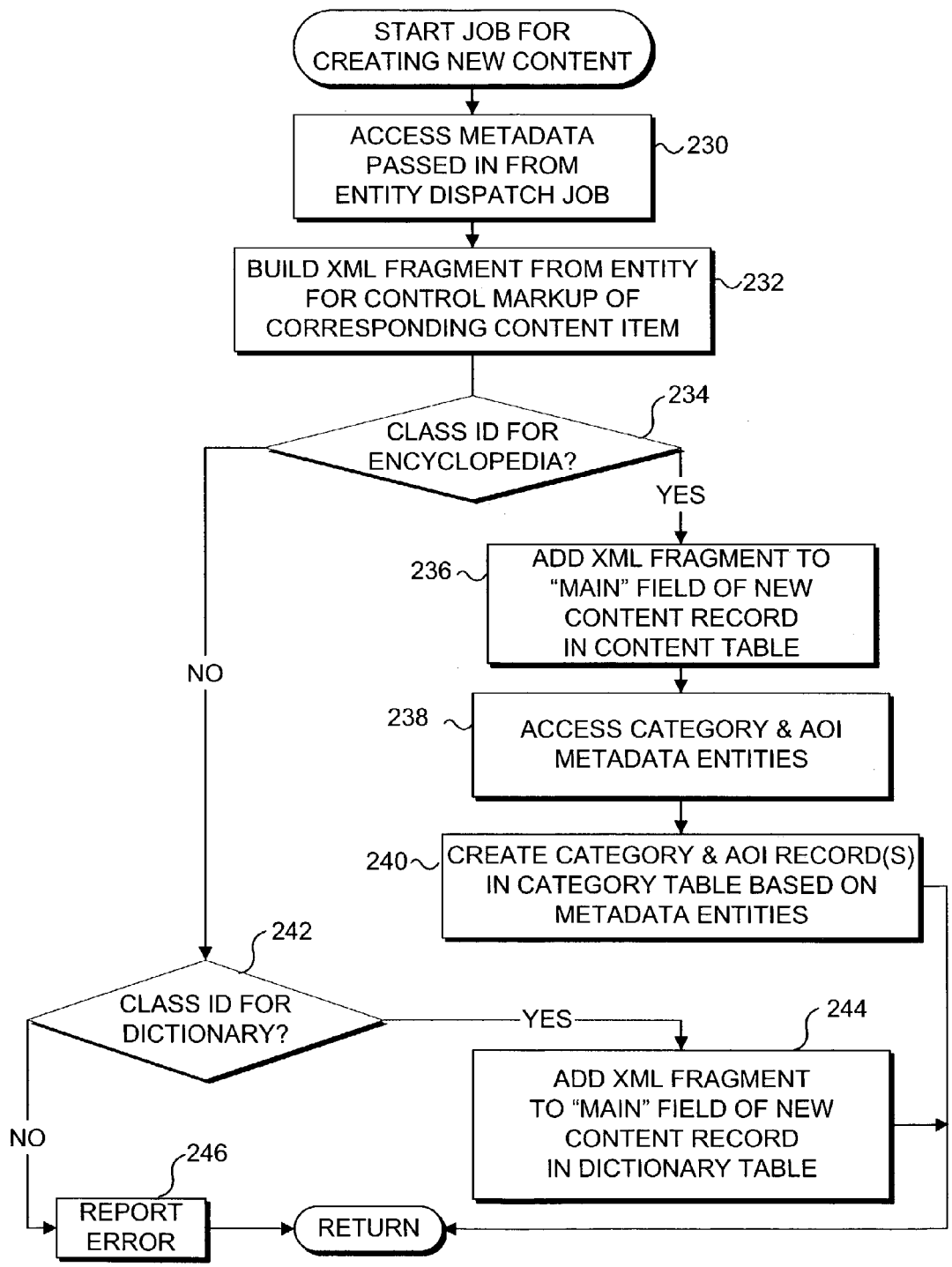
FIG. 9 is a flow diagram illustrating the logic for creating metadata content in the table(s) that will be used for final delivery of text and other content to users in the runtime environment.

The following discussion is directed at creating new metadata content. FIG. 9 is a flow diagram illustrating the logic employed for creating metadata content in the table(s) that will be used for final delivery of text and other content to users in the runtime environment. At a step 230, the build system accesses metadata that were passed in from the entity dispatch job of FIG. 8. The metadata comprise entities and information from the class table and the class entities table. From the metadata, the build system creates an XML fragment at a step 232. The XML fragment will be used as control markup of a corresponding content item (for a unique REFID). For example, if an entity that was passed in specifies that the content item is to be freely accessible to all users of the online encyclopedia, the build system creates an XML fragment that includes an attribute specifying that the content item is free. The build system may also add XML code to make the title of the content item sortable based on a sort title entity. The build system may further evaluate entities that specify copyright limitations for online use of the content item, and add appropriate XML code to control delivery of the content item to online users. In general, as indicated above, the metadata defined in the entities.its file, the class table, the class entity table, and other static source data, enable nonprogrammers to easily update and maintain access control and other aspects related to delivering content to users without having to revise program code for the build system. Instead, the build system creates the necessary XML code from the entities and other metadata so that editorial staff and other nonprogrammers can focus on the content and delivery service rather than on editing code.

Once a complete XML fragment is created from the metadata, the build system determines, at a decision step 234, whether the class identifier that was passed in indicates that the metadata is associated with encyclopedia content. If the metadata indicates that the XML fragment is associated with encyclopedia content, the build system creates a new record in the content table of encyclopedia content and adds the XML fragment to a "main" field of the new record at a step 236. Because the job may be instantiated multiple times, multiple XML fragments may be assembled into the "main" field. A sample XML fragment from the main field of the content table is illustrated in Appendix D. Encyclopedia content is preferably always associated with some category and area of interest metadata, as described above. Accordingly, the category and area of interest metadata are accessed at a step 238. At a step 240, the build system creates corresponding category and area of interest records in the category table. Control then returns to the controlling module.

If the class identifier did not indicate that the metadata are associated with encyclopedia content, the build system determines, at a decision step 242, whether the class identifier indicates that the metadata are instead associated with dictionary content. If the metadata are associated with dictionary content, the build system adds the XML fragment to a "main" field of a new content record in the dictionary table, at a step 244, instead of the content table. Because dictionary content is inherently alphabetically structured, dictionary content preferably does not have associated category and area of interest metadata. Nevertheless, those skilled in the art will recognize that category and area of interest metadata may be associated with dictionary content to enable cross referencing of dictionary content by subject matter. If the build system does not recognize a valid class identifier, an error is reported, at a step 246, before control is returned to the calling module.

Figure 10:
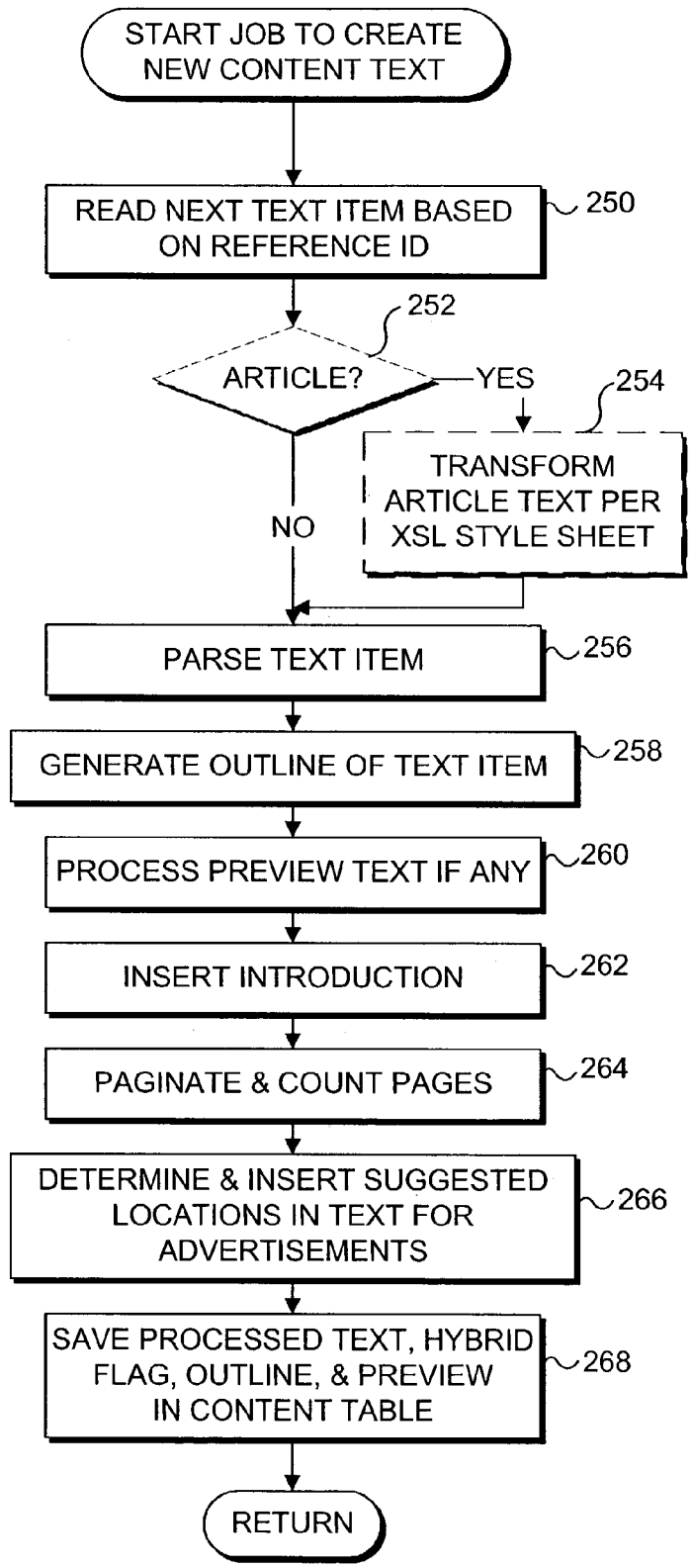
FIG. 10 is a flow diagram illustrating logic for creating content text in the content table.

Once all of the metadata have been processed through the various jobs described above, the build system processes content text. Preferably, the build system processes all loose files of text before processing primary text from a large static text.its file. However, both sources of text are processed in the same manner. FIG. 10 is a flow diagram illustrating logic for creating content text in the content table. At a step 250, the build system reads a text item from the loose file or text.its file that is currently being processed. Each text item is identified by the REFID that associates the text item with corresponding metadata.

Optionally, the build system determines, at a decision step 252, whether the text item comprises an article (e.g., has a class name corresponding to the article class). If the text item comprises an article, the build system may optionally transform the article text according to an extensible stylesheet language (XSL) style sheet at a step 254. For example, the build system may transform a first few paragraphs of the article into an introduction section. The build system may also insert the article title in a logical position according to the XSL style sheet, or perform other transformations.

At a step 256, the build system parses the text item into an XML tree. From the XML tree, the build system generates an outline of the text item, at a step 258. Similarly, at a step 260, the build system generates a preview text that very briefly summarizes the text and can be displayed in a search result list when users submit a query. At a step 262, the build system inserts an introduction taken from the above XSL transformation or produced directly from the text item.

Having structured the text item as described above, the build system paginates the text item according to the size of a standard browser window and counts the resulting number of pages, at a step 264. Based on the resulting positions of sections and paragraphs in the paginated text, the build system determines available space on each page. At available spaces, the build system inserts associated items such as media or sidebars and suggested locators for advertisements, at a step 266. At a step 268, the build system saves the processed text into a text data field of the content table. A sample of resulting text and corresponding XML markup is illustrated in Appendix E. The build system also saves the outline and preview in corresponding fields of the content table. The build system may further save one or more flags in the content table, such as a hybrid flag that indicates that the text item does not have any sections within it. Control then returns to the controlling module.

Figure 11:
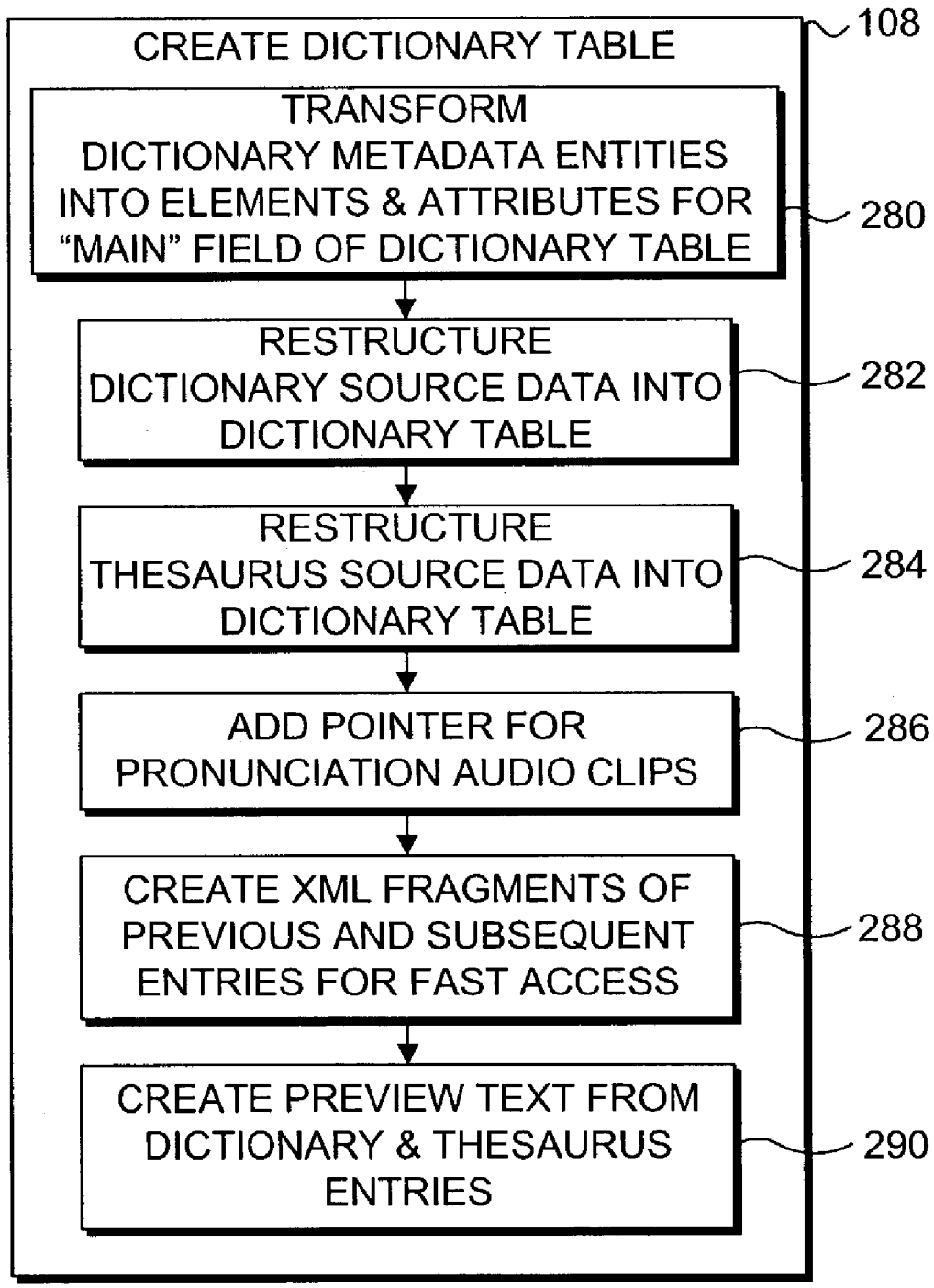
FIG. 11 is a flow diagram illustrating logical steps for creating a dictionary table.

In a manner that is similar to creating text and metadata for the content table, text and metadata are created for a dictionary table to provide a source of definitions to online users. FIG. 11 is a flow diagram illustrating the logic used for creating a dictionary table and provides further details of step 108 from FIG. 3. At a step 280 in FIG. 11, the build system transforms metadata entities associated with dictionary items into elements and attributes for the "main" field of the dictionary table. Details of this step are similar to those of FIGS. 6–9. However the dictionary source text is preferably processed more quickly by utilizing preprocessed text that was created for delivery with a CD/DVD version of the database. The build system restructures the preprocessed dictionary source data for network delivery and stores the restructured data in the dictionary table, at a step 282. Similarly, the build system restructures preprocessed thesaurus source data into the dictionary table, at a step 284. The thesaurus data are associated with the dictionary data so that synonyms, antonyms and other related words are available for items in the dictionary. Some of the dictionary words also have an audio clip providing pronunciation of a dictionary word. Thus, at a step 286, the build system adds a pointer into the dictionary table for dictionary words that have an associated pronunciation audio clip.

At a step 288, the build system creates XML fragments of a few dictionary items that alphabetically occur prior to and after each dictionary item of the dictionary table. This step enables fast access to a nearby dictionary item. To further speed user access, the build system creates a preview text for each dictionary item from the text of the dictionary item and the text of related thesaurus entries. XML fragments for the preview text are created at a step 290 and are stored in a preview field of the dictionary table.

Figure 12:
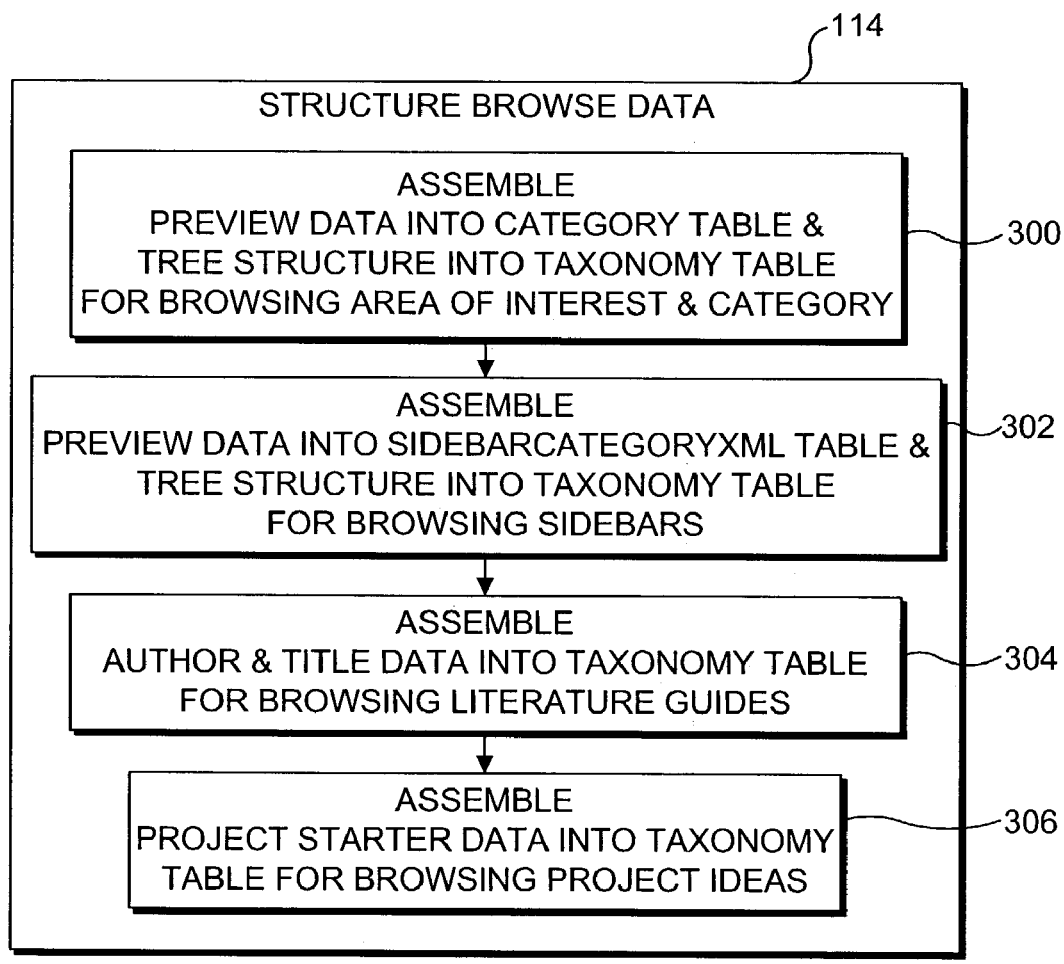
FIG. 12 is a flow diagram illustrating the logic employed for creating taxonomies that enable a user to browse the content.

Encyclopedia content is generally accessible alphabetically, just as the dictionary content. However, it is desirable to also make the encyclopedia content accessible by other relationships. As discussed above, most encyclopedia content is associated with an area of interest and a category within the area of interest. However, it is difficult to maintain a single tree structure of all encyclopedia content based simply on areas of interests and categories. Thus, the build system further correlates the encyclopedia content into a smaller set of content groups relative to the content class. Exemplary groups include articles, photos, maps, sounds, Web links, and videos. Each class of content can belong to more than one group. For each group, a tree structure of the areas of interest and categories enables users to easily browse through related encyclopedia content. The tree structure of a group is referred to as its taxonomy. FIG. 12 is a flow diagram illustrating the logical steps for creating the taxonomies that enable browsing and provides further details of step 114, which is included in FIG. 3.

At a step 300 of FIG. 12, the build system assembles preview data of encyclopedia items into the category table, and assembles the tree structure into a taxonomy table for browsing the areas of interest and categories. Further detail regarding step 300 is discussed below with regard to FIG. 13. In a very similar manner, at a step 302, the build system assembles preview data of sidebar items into a sidebar category XML table, and assembles a tree structure into the taxonomy table for browsing sidebar items. As mentioned above, sidebar content typically corresponds to content that is purchased from outside sources, rather than content created by the (internal) authors of the encyclopedia content.

In some special cases, the amount of browsable content of some types of data is sufficiently limited that the content can be stored along with the tree structure in the taxonomy table, rather than simply including a reference to the content in the content table. For example, at a step 304, the build system assembles author and title data into the taxonomy table so that users may browse through literature guides. Similarly, the build system assembles data regarding project ideas into the taxonomy table, at a step 306. Having some of this limited data in the taxonomy table speeds access to the data while the user is browsing.

Figure 13:
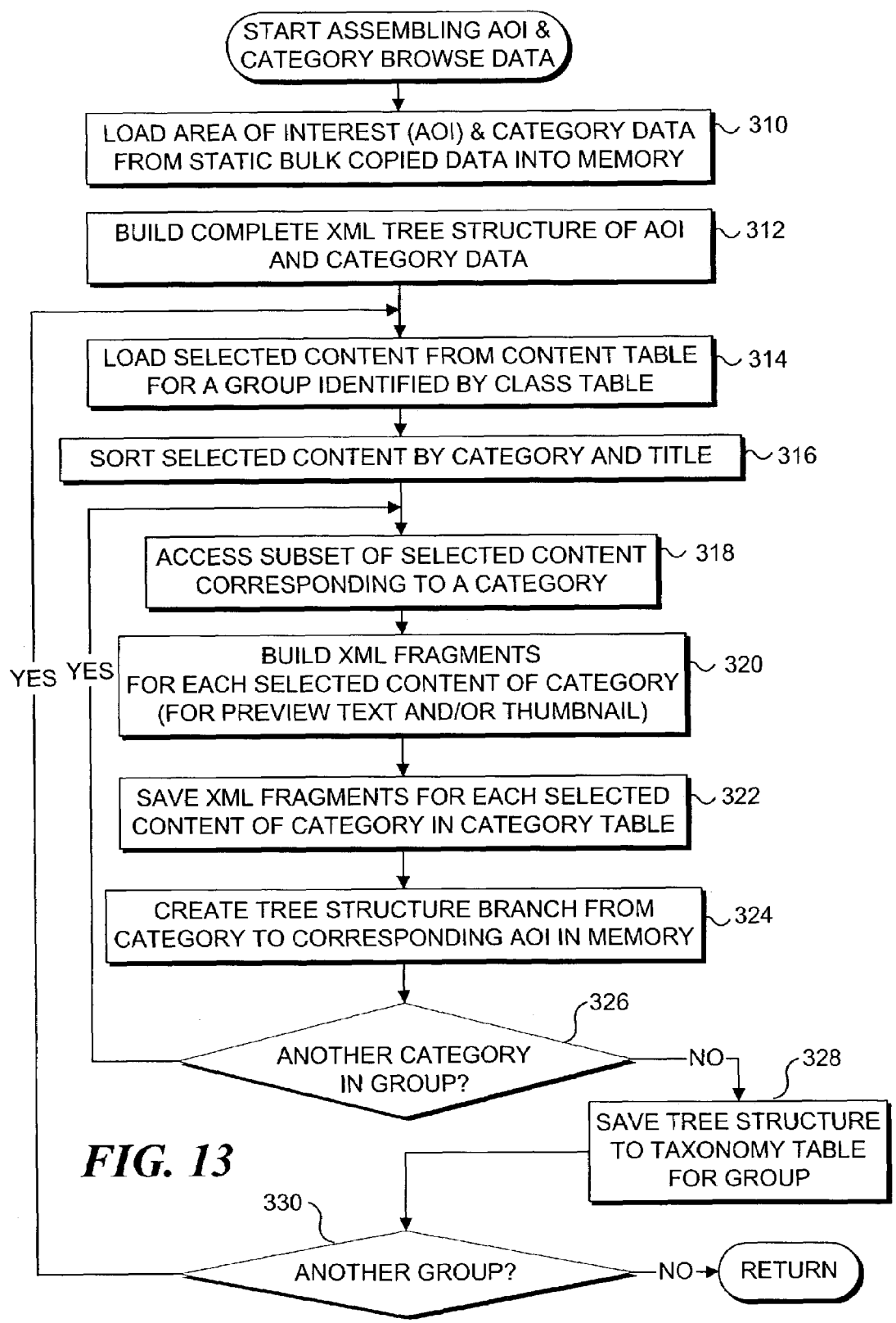
FIG. 13 is a flow diagram illustrating detailed logical steps for assembling area of interest browse data and category browse data.

FIG. 13 is a flow diagram illustrating further detailed logic for assembling area of interest and category browse data. At a step 310, the build system loads area of interest and category data from the static source data that were bulk copied from the dynamic source data. For example, the area of interest data may be read from an AreaOfIinterest.bcp file and loaded into memory. The area of interest and category data stored in the bulk copy files are related to, but distinguished from, the area of interest and category entities stored in the entities.its file. As shown in Appendix A, an area of interest entity and a category entity in the entities.its file identify the corresponding area of interest and category of a particular content item that is identified by the REFID. The data from the static bulk copied data identifies the hierarchical relationships between areas of interest and categories. Appendix F1 illustrates a sample structure relating areas of interest to relevant categories for a group corresponding to media content that comprises surround views, which enable a user to view a virtual area in 360 degrees as if the user were standing in one spot and spinning around. Similarly, Appendix F2 illustrates a sample structure relating an ancient history category (identified by category identification number 37) to relevant content data. From the static bulk copied data, the build system creates a complete XML tree structure of the area of interest and category data in memory, at a step 312.

At a step 314, the build system loads selected content from the content table for a first group identified by the class table. For example, the build system may load outline data, preview data, and other selected data for the group of browse category surround views, as identified in the class table of Appendix B. Once loaded, the build system sorts the selected content by category and title, at a step 316. Preferably, a predetermined sort title is part of the selected content and used for this sorting step.

At a step 318, the build system accesses a subset of the selected content corresponding to one of the categories of the group (e.g., the ancient history category). The build system then creates XML fragments for each of the selected content items of the category, at a step 320. In carrying out this step, the build system may loop through each selected content item in the ancient history category to assemble XML fragments of preview text and/or a thumbnail image. At a step 322, the build system saves the XML fragments in the category table. Having essentially created a number of lowest level nodes for the browsable tree structure, the build system creates an associated branch from the category to the corresponding area of interest in memory, at a step 324. Building branch associations from the lowest nodes up to the root optimizes the size of the tree structure.

At a decision step 326, the build system determines whether another category is available in the current group. If so, control returns to step 318 to process the next remaining category. Once all categories of the group are processed, the build system saves the created XML tree structure to the taxonomy table, at a step 328. After saving the tree structure for a group, the build system determines, at a decision step 330, whether another group is available for processing. If, according to the class table, another group is available, control returns to step 314 to process the next group.

Figure 14:
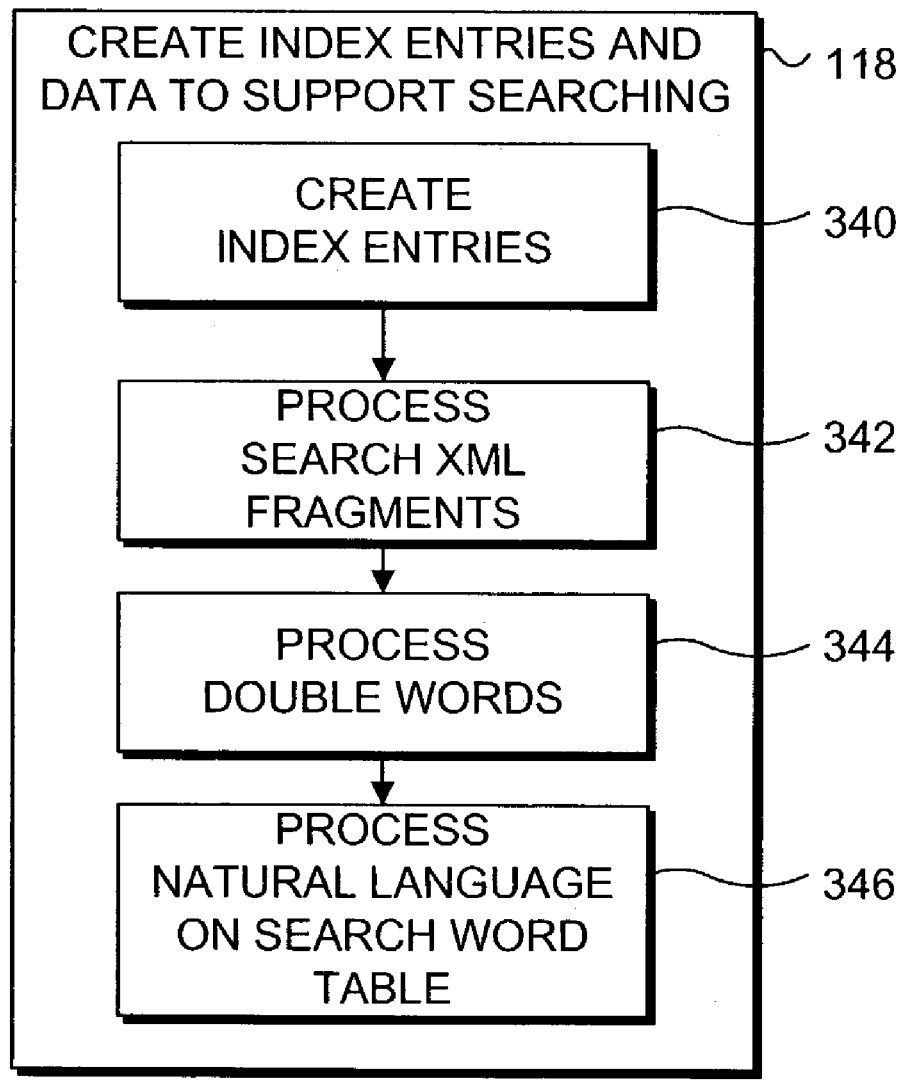
FIG. 14 is a flow diagram outlining logical steps for creating indices and data to support searching the content via a runtime process.

Having prestructured the browse data, the build system further improves accessibility to the content data by creating index entries and associated index data to support user searches. FIG. 14 is a flow diagram outlining logic for creating the index and data to support searching. FIG. 14 provides some detail of step 118 in FIG. 3. However, more extensive detail is provided in the patent applications incorporated above (Ser. Nos. 09/867,228 and 10/187,859).

The general indexing process begins at a step 340, in which the build system creates index entries in the index table. At a step 342, the build system creates XML fragments of preview data for content records that do not already have XML preview data. Certain content, such as thumbnails, outlines, and related articles, will not necessarily have preview data. Instead, these types of content are sufficiently concise to possibly enable exact matches with a search query entered by the user. Since these types of content do not already have preview data, preview data are created so that a description can be provided to the user who enters a search request that exactly matches the type of content.

At a step 344, the build system creates unique pairs of words that speed searching and retrieval of desired content. For example, if a search query includes the search terms "Russian" and "history," a faster and more accurate search can be performed by identifying the pair of terms as a single index to relative content. The build system may also perform another indexing step 346 that identifies key words of the full text of content items. This process may be too slow for very large sources of content. Thus, the build system may perform natural language selection on a search word table of token words taken from the text of the content items.

Figure 15A:
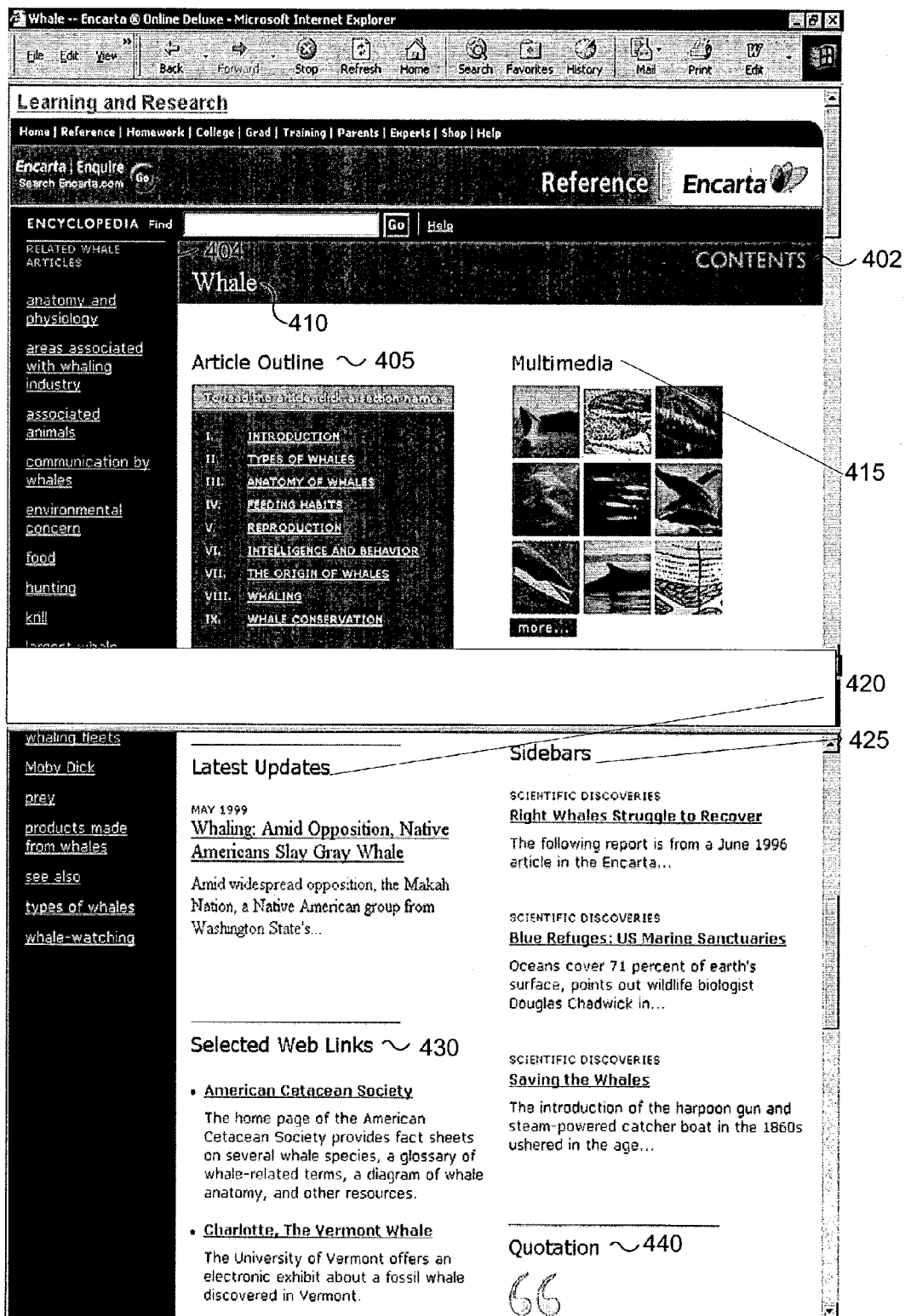

The entire build process described above is intended to at least enable flexible control of the content by nonprogrammers, and to preformat the content for fast delivery to a user. To provide some perspective on the desired outcome of the above build process, a sample Web page is illustrated in FIGS. 15A and 15B. FIGS. 15A and 15B, which together comprise FIG. 15, illustrate screen shots 400A and 400B of an exemplary display resulting from a query on the word "whale." A Contents section 402 displays an article entitled "Whale." A Related Articles section 404 displays an index of encyclopedia articles that are related to the Whale article. An Article Outline section 405 displays a hyperlinked outline of the article. A Multimedia section 415 displays various multimedia items related to the Whale article. A Latest Updates section 420 displays recent articles related to the Whale article. A Sidebars section 425 display scientific discovery articles that were provided by outside authors. A Selected Web Links section 430 display links to relevant Web sites. A Quotation section 440 displays an interesting quote related to the Whale article. A Further Reading section 445 provides links to recommended books and journals. A News Headlines section 450 enables a user to search news sites for related articles. A Periodicals section 455 searches for related periodical articles. An Internet Search section 460 enables the user to search the Internet for related sites.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for transforming content data from a source structure that is readily created and editable by an author without requiring that the author have programming skills, into an output structure that enables efficient access of the content data, so that the content data can be quickly retrieved, delivered, and accessed over a network by a user in response to a search request, comprising the steps of:
   (a) prior to receiving the search request, predefining the output structure to have a plurality of fields for storing portions of the content data that will be accessible by the user over the network in response to the search request;
   (b) predefining metadata for the content data, said metadata indicating a subset of the content data that is deliverable over the network for access by the user and indicating relationships between elements of the content data;
   (c) within the metadata, defining a plurality of entities and a plurality of classes of the content data, wherein each class of the plurality of classes indicates the portions of the content data that are to be included in the output structure, and wherein the plurality of entities defines format and delivery characteristics of individual content data items of the content data to be formatted in the output structure for access by the user;
   (d) as a function of the metadata, determining in which fields of a plurality of fields of the output structure the portions of the content data are to be stored;
   (e) obtaining the portions of the content data from the source structure in accord with the plurality of classes and the plurality of entities of the metadata; and
   (f) storing the portions of the content data in the plurality of fields of the output structure as determined by the metadata.

2. The method of claim 1, further comprising the step of preformatting the portions of the content data in the output structure for access by the user.

3. The method of claim 1, wherein the content data comprises a plurality of content data items, and each content data item is identified by a reference identifier.

4. The method of claim 1, wherein the plurality of fields comprises at least one of:
   (a) a class identifier field that stores an identifier of one of the plurality of classes;
   (b) a main field that identifies other fields to be accessed for content of an individual content data item to be provided for access by the user;
   (c) a text data field that stores text of a content data item, wherein the text is formatted for access by the user;
   (d) a forward field that stores alternate content data related to a content data item, wherein the alternate content data are formatted for access by the user;
   (e) a related articles field that stores a reference to a text article related to the content data item, if such a text article is available;
   (f) an outline field that stores data defining an outline of a content data item, wherein said data are formatted for access by the user;
   (g) an online free field that stores an indication of whether a content data item may be accessed by the user at no cost; and
   (h) a title field that stores a title of a content data item, wherein the title is formatted for access by the user.

5. The method of claim 1, wherein the plurality of classes comprises at least one of an article class for text articles, a photo class for a photographs, a tables class for tables, a video class for moving visuals, a fact class for brief facts related to a content data item; an image class for images, an audio class for audio media, a sidebar class for sidebar information, a weblink class for links to other content available through a network, a quotation class for notable quotations, an author class for author information, and a biography class for biographical information.

6. The method of claim 1, further comprising the step of determining where to place supplemental content within the content data.

7. The method of claim 1, further comprising the step of accessing a plurality of predefined areas of interest that subdivide the content data.

8. The method of claim 7, further comprising the steps of:
   (a) associating at least one of the plurality of predefined areas of interest and at least one of a plurality of predefined categories with a selected portion of the content data; and
   (b) storing the at least one of the plurality of predefined areas of interest, the at least one of the plurality of predefined categories, and the selected portion of the content data in a browse table to define a hierarchical structure that the user can access to retrieve the selected portion of the content data.

9. The method of claim 8, wherein the plurality of predefined areas of interest and the plurality of predefined categories are associated with the plurality of entities for each of the plurality of classes of the content data, thereby associating the plurality of predefined areas of interest and the plurality of predefined categories with individual content data items.

10. The method of claim 1, wherein the content data conforms to extensible Markup Language (XML) standards.

11. A memory medium having machine instructions stored thereon for carrying out the steps of claim 1.

12. A system for transforming content data from a source structure that is readily created and editable by an author without requiring that the author have programming skills, into an output structure that enables efficient access of the content data, so that the content data can be quickly retrieved, delivered, and accessed over a network by a user in response to a search request, comprising:
   (a) a processor;
   (b) a network interface in communication with the processor and enabling communication with a remote device operated by a user; and
   (c) a memory in communication with the processor and storing machine instructions, said machine instructions causing the processor to carry out a plurality of functions, including:
      (i) prior to receiving the search request, predefining the output structure to have a plurality of fields for storing portions of the content data that will be accessible by the user via the network interface in response to the search request;
      (ii) accessing predefined metadata for the content data, said metadata indicating a subset of the content data that is deliverable via the network interface for access by a user and indicating relationships between elements of the content data;
      (iii) within the metadata, defining a plurality of entities and a plurality of classes of the content data, wherein each class of the plurality of classes indicates the portions of the content data that are to be included in the output structure, and wherein the plurality of entities defines format and delivery characteristics of individual content data items of the content data to be formatted in the output structure for access by a user via the network interface;
      (iv) as a function of the metadata, determining in which fields of a plurality of fields of the output structure the portions of the content data are to be stored;
      (v) obtaining the portions of the content data from the source structure in accord with the plurality of classes and the plurality of entities of the metadata; and
      (vi) storing the portions of the content data in the plurality of fields of the output structure as determined by the metadata.

13. The system of claim 12, wherein said machine instructions further cause the processor to carry out the function of preformatting the portions of the content data in the output structure for access by the user via the network interface.

14. The system of claim 12, wherein the content data comprises a plurality of content data items, and each content data item is identified by a reference identifier.

15. The system of claim 12, wherein the plurality of fields comprises at least one of:
   (a) a class identifier field that stores an identifier of one of the plurality of classes;
   (b) a main field that identifies other fields to be accessed for content of an individual content data item to be provided for access by the user;
   (c) a text data field that stores text of a content data item, wherein the text is formatted for access by the user;
   (d) a forward field that stores alternate content data related to a content data item, wherein the alternate content data are formatted for access by the user;
   (e) a related articles field that stores a reference to a text article related to the content data item, if such a text article is available;
   (f) an outline field that stores data defining an outline of a content data item, wherein said data are formatted for access by the user;
   (g) an online free field that stores an indication of whether a content data item may be accessed by the user at no cost; and
   (h) a title field that stores a title of a content data item, wherein the title is formatted for access by the user.

16. The system of claim 12, wherein the plurality of classes comprises at least one of an article class for text articles, a photo class for a photographs, a tables class for tables, a video class for moving visuals, a fact class for brief facts related to a content data item; an image class for images, an audio class for audio media, a sidebar class for sidebar information, a weblink class for links to other content available through a network, a quotation class for notable quotations, an author class for author information, and a biography class for biographical information.

17. The system of claim 12, wherein said machine instructions further cause the processor to carry out the function of determining where to place supplemental content within the content data.

18. The system of claim 12, wherein said machine instructions further cause the processor to carry out the function of accessing a plurality of predefined areas of interest that subdivide the content data.

19. The system of claim 18, wherein said machine instructions further cause the processor to carry out the functions of:
   (a) associating at least one of the plurality of predefined areas of interest and at least one of a plurality of predefined categories with a selected portion of the content data; and
   (b) storing the at least one of the plurality of predefined areas of interest, the at least one of the plurality of predefined categories, and the selected portion of the content data in a browse table to define a hierarchical structure that a user can access via the network interface to retrieve the selected portion of the content data.

20. The system of claim 19, wherein the plurality of predefined areas of interest and the plurality of predefined categories are associated with the plurality of entities for each of the plurality of classes of the content data, thereby associating the plurality of predefined areas of interest and the plurality of predefined categories with individual content data items.

* * * * *